(12) United States Patent
Hua et al.

(10) Patent No.: US 6,563,719 B1
(45) Date of Patent: May 13, 2003

(54) SELF-DRIVEN SYNCHRONOUS RECTIFICATION SCHEME

(75) Inventors: Guichao Hua, Edison, NJ (US); Yi Jiang, Hangzhou (CN)

(73) Assignee: Bel-Fuse, Inc., Jersey City, NJ (US)

( * ) Notice: Subject to any disclaimer, the term of this patent is extended or adjusted under 35 U.S.C. 154(b) by 0 days.

(21) Appl. No.: 10/119,424

(22) Filed: Apr. 9, 2002

(51) Int. Cl.$^7$ .............................................. H02M 3/335
(52) U.S. Cl. ...................... 363/21.06; 363/127; 363/80; 363/89
(58) Field of Search ...................... 363/21.04, 21.06, 363/21.14, 80, 89, 90, 127

(56) References Cited

U.S. PATENT DOCUMENTS

| | | |
|---|---|---|
| 4,519,024 A | 5/1985 | Federico et al. |
| 4,716,514 A | 12/1987 | Patel |
| 5,038,266 A | 8/1991 | Callen et al. |
| 5,274,543 A | 12/1993 | Loftus, Jr. |
| 5,663,877 A | 9/1997 | Dittli et al. |
| 5,734,563 A | 3/1998 | Shinada |
| 6,011,703 A | 1/2000 | Boylan et al. |
| 6,084,792 A * | 7/2000 | Chen et al. ................. 363/127 |
| 6,091,616 A * | 7/2000 | Jacobs et al. ................. 363/127 |
| 6,104,623 A | 8/2000 | Rozman |
| 6,169,675 B1 | 1/2001 | Shimamori et al. |
| 6,275,540 B1 | 8/2001 | Xia |
| 6,301,139 B1 | 10/2001 | Patel |

* cited by examiner

Primary Examiner—Gregory J. Toatley, Jr.
Assistant Examiner—Gary L. Laxton
(74) Attorney, Agent, or Firm—Ostrolenk, Faber, Gerb & Soffen, LLP (57) ABSTRACT

A self-driven synchronous rectification circuit which includes two power switches $S_1$ and $S_2$; a transformer Tr having a primary winding $N_p$, a secondary winding $N_s$ and an auxiliary winding $N_a$; two secondary synchronous rectifiers $S_3$ and $S_4$; two diodes $D_1$ and $D_2$; two switching transistors $Q_1$ and $Q_2$; and two zener diodes $ZD_1$ and $ZD_2$. The number of auxiliary winding turns $N_a$ of the transformer Tr ensure that the synchronous rectifiers $S_3$ and $S_4$ are supplied with an adequate gate-drive voltage. When $S_3$ conducts, the gate-drive voltage of $S_4$ is clamped by $D_1$ and $Q_1$. Likewise, when $S_4$ conducts, the gate-drive voltage of $S_3$ is clamped by $D_2$ and $Q_2$. $ZD_1$ and $ZD_2$ operate to restrain the gate over voltage of $S_3$ and $S_4$, respectively. When the gate drive voltage of $S_4$ is clamped by $D_1$ and $Q_1$, $Q_2$ disables $D_2$ and when the gate drive voltage of $S_3$ is clamped by $D_2$ and $Q_2$, $Q_1$ disables $D_1$.

9 Claims, 7 Drawing Sheets

SELF-DRIVEN SYNCHRONOUS RECTIFICATION SCHEME

BACKGROUND OF THE INVENTION

The present invention relates to DC-DC converters and, more particularly, to a self-driven, synchronous rectification scheme for a DC-DC power converter.

There is an ever-increasing demand in the power electronics market for low voltage and high current DC-DC converters. As output voltage is desired to be 3.3V or lower, even a state-of-the-art schottky diode with a forward voltage drop of 0.3V has an unacceptable amount of power loss.

Because of this, synchronous rectifier circuits are often used to improve the efficiency of DC-DC converters. Generally, there are two types of synchronous rectifier circuits, self-driven and externally driven. Since the self-driven mode is usually less complex, less costly and more reliable, it is preferred for use with most low voltage DC-DC converter applications.

Figure 1A:
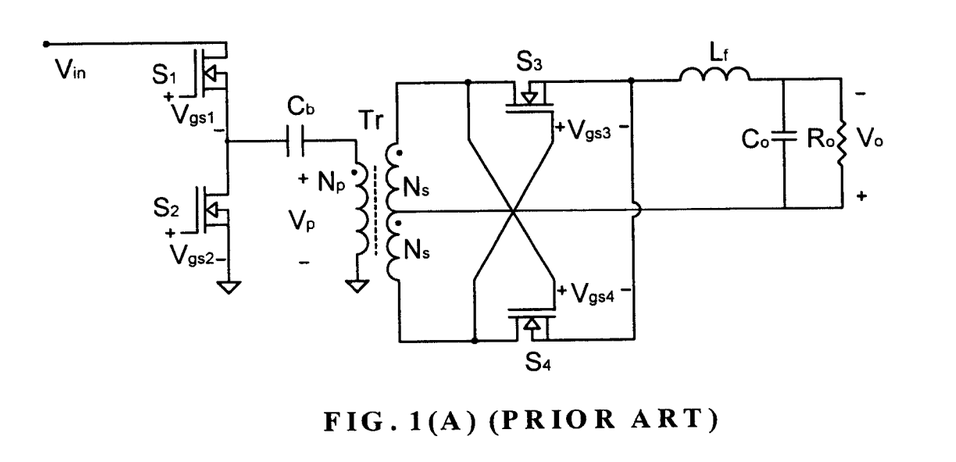
FIG. 1(A) is a circuit diagram of conventional self-driven synchronous rectification, asymmetrical ZVS HB converter.
Figure 1B:
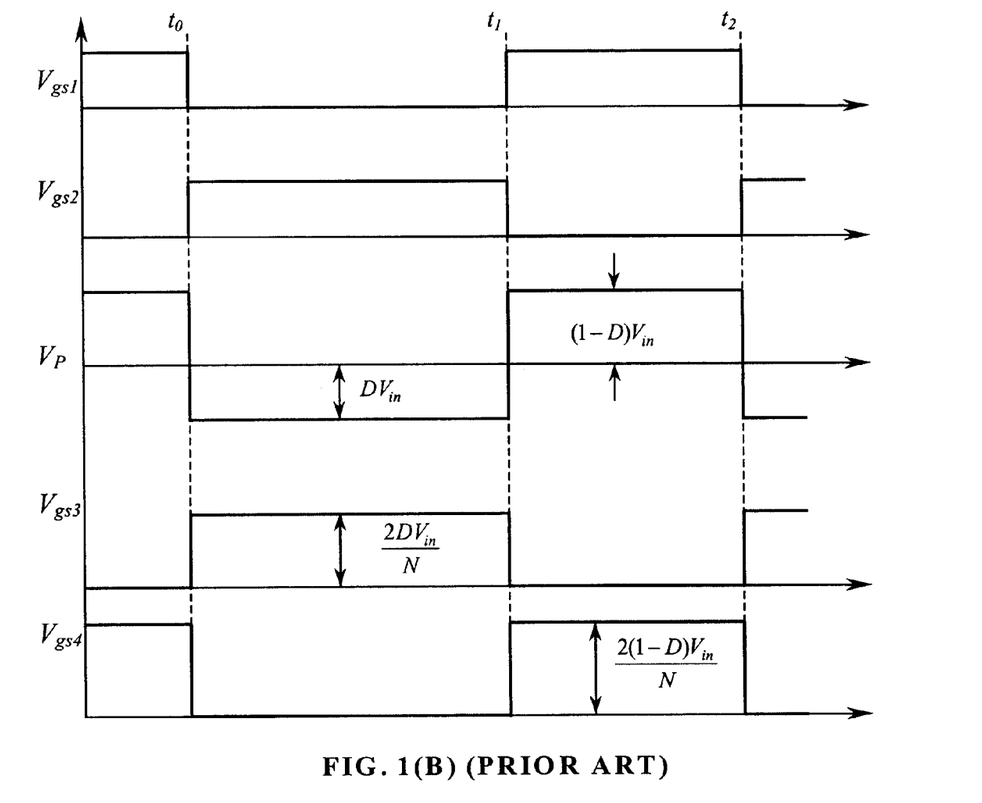
FIG. 1(B) illustrates the switching waveform occurring in the converter illustrated in FIG. 1(A)

FIG. 1(A) illustrates a conventional self-driven synchronous rectification, asymmetrical, zero voltage switching (ZVS) half-bridge (HB) topology which is only generally suitable for applications where the output voltage is in the range of from about 3.3V to 6V. Referring to FIG. 1B, the gate-drive voltages $V_{gs3}$ and $V_{gs4}$ of synchronous rectifiers (SRs) $S_3$ and $S_4$, respectively, are as follows: (1)

$$V_{gs3} = \frac{2N_s}{N_p}DV_{in} = \frac{2}{N}DV_{in} = \frac{V_o}{1-D} \quad (t_0 \leq t \leq t_1) \quad (1)$$

$$V_{gs4} = \frac{2N_s}{N_p}(1-D)V_{in} = \frac{2(1-D)}{N}V_{in} = \frac{V_o}{D} \quad (t_1 \leq t \leq t_2) \quad (2)$$

wherein, $V_{in}$ is the input voltage; $V_o$ is the output voltage; D is the steady-state duty cycle; $N_p$ is the number of primary winding turns of the transformer; $N_s$ is the number of secondary turns of the transformer; and N is the turn ratio of the transformer. The turn ratio of the transformer TR is calculated by dividing the number of primary windings by the number of secondary windings (i.e. $N=N_p/N_s$).

FIG. 1(B) illustrates the switching waveform occurring in the converter illustrated in FIG. 1(A). As shown in FIG. 1(B), the gate-drive voltage $V_{gs4}$ of $S_4$ is always higher than the gate-drive voltage $V_{gs3}$ of $S_3$ if D is less than 50%. If we assume that the minimum steady-state duty cycle D at heavy load is 30%, then $V_{gs3}$ is about 1.4V, and $V_{gs4}$ is about 3.3V. Since most synchronous rectifiers (including logic level devices) only work well with the gate-drive voltage between about 4V and 20V, the circuit shown in FIG. 1(A) only works well when the output voltage $V_O$ is between 2.9V to 6V. If the output voltage is below 2.9V, $S_3$ would be under driven. If the output voltage were above 6V, then $S_4$ would be over driven. In either case the synchronous rectifiers are easily rendered inoperative.

Figure 2A:
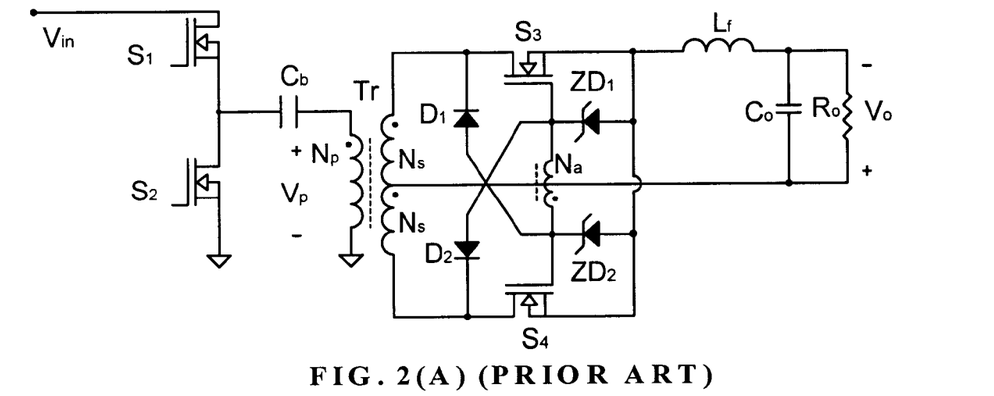
FIG. 2(A) is a circuit diagram of another asymmetrical ZVS HB converter which incorporates a self-driven synchronous rectifier circuit.

FIG. 2(A) shows a circuit diagram of an asymmetrical ZVS HB converter incorporating the self-driven synchronous rectifier circuit of the invention disclosed in U.S. patent application Ser. No. 09/932,398, filed Aug. 17, 2001, the entire disclosure of which is incorporated by reference herein. The self-driven synchronous rectifier circuit of FIG. 2(A) includes two power switches $S_1$ and $S_2$; a transformer Tr having a primary winding $N_p$, a secondary winding $N_s$ and an auxiliary winding $N_a$; two secondary synchronous rectifiers $S_3$ and $S_4$; two diodes $D_1$ and $D_2$; and two zener diodes $ZD_1$ and $ZD_2$.

In the circuit of FIG. 2(A), when $S_3$ conducts, the gate-drive voltage of $S_4$ is clamped by $D_1$. Also, when $S_4$ conducts, the gate-drive voltage of $S_3$ is clamped by $D_2$. In other words, $D_1$ and $D_2$ prevent $S_3$ and $S_4$ from conducting at the same time. $ZD_1$ and $ZD_2$ operate to restrain the gate over voltage of $S_3$ and $S_4$, respectively. Because of this circuit configuration, the self-driven synchronous rectifier circuit operates normally at various output voltages, such as low output voltages of 2.9V or lower and/or high output voltages above 6V.

Figure 2B:
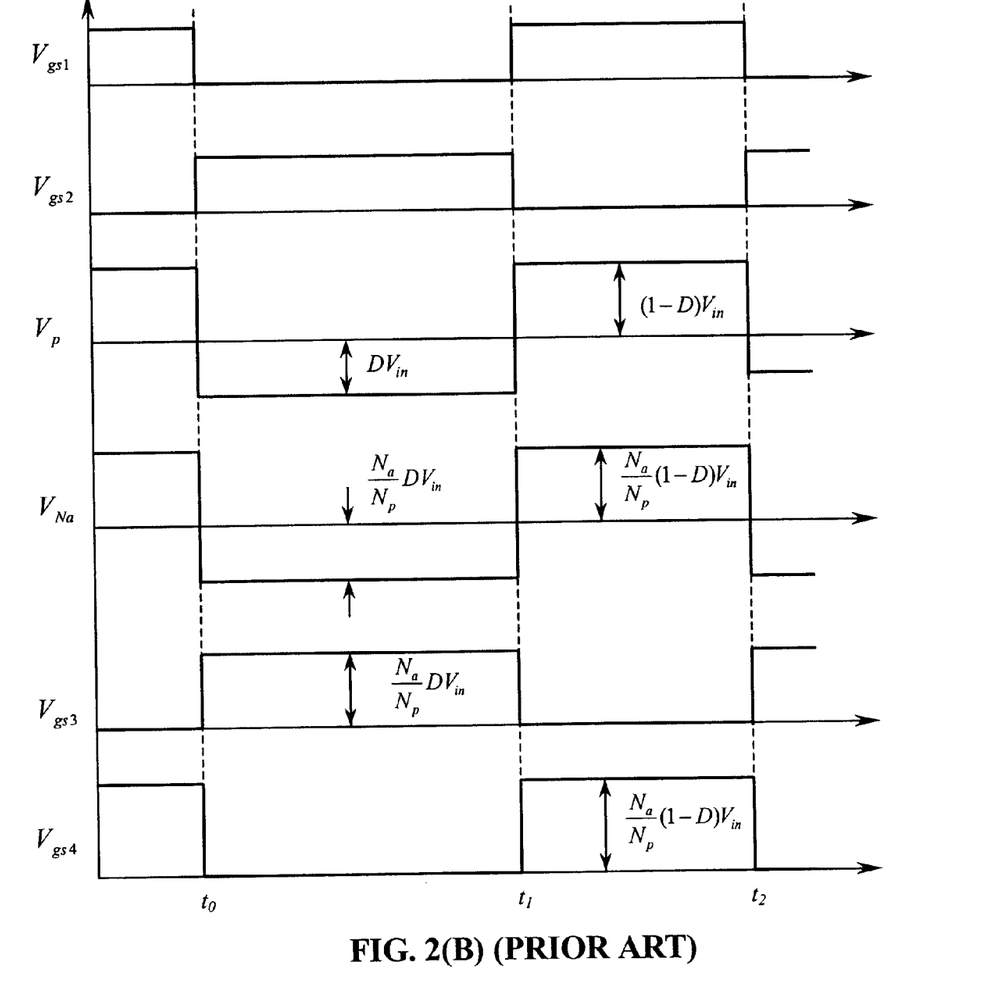
FIG. 2(B) illustrates the switching waveform occurring in the converter of FIG. 2(A)

FIG. 2(B) illustrates the switching waveform of the converter shown in FIG. 2(A). $V_{gs1}$ and $V_{gs2}$ represent the gate voltage waveforms of the two power switches $S_1$ and $S_2$. $V_p$ is the primary voltage waveform of transformer Tr. $V_{Na}$ is the voltage waveform of the auxiliary winding. $V_{gs3}$ and $V_{gs4}$ represent the gate voltage waveforms of the two synchronous rectifiers $S_3$ and $S_4$. $V_{gs3}$ and $V_{gs4}$ are calculated as follows:

$$V_{gs3} = \frac{N_a}{N_p}DV_{in} \quad (t_0 \leq t \leq t_1) \quad (3)$$

$$V_{gs4} = \frac{N_a}{N_p}(1-D)V_{in} \quad (t_1 \leq t \leq t_2) \quad (4)$$

wherein, D is the on-time of switch S1 in percent duty cycle; 1-D is the on-time of switch $S_2$ in percent duty cycle; $N_p$ is the number of primary winding turns of transformer Tr; $N_a$ is the number of auxiliary winding turns of the transformer Tr; and $V_{in}$ is the input voltage.

Comparing equations (3) and (4) above with equations (1) and (2), it can be seen, the gate voltage of self-driven synchronous rectifiers $S_3$ and $S_4$ may be adjusted by selecting the number of auxiliary winding turns $N_a$ of transformer Tr. This selection of the auxiliary number of winding turns $N_a$ ensures a reasonable gate-drive voltage for the synchronous rectifiers $S_3$ and $S_4$ even when the output voltage is lower than 2.9V or higher than 6V.

Conventionally, the demand for self-driven synchronous rectifier is satisfied by the second scheme. But as logic integrated circuits have migrated to lower working voltages, it is expected that the next generation of integrated circuits will require power supplies with voltage in the 1–2V range. This will confront the second self-driven scheme with great challenges. As shown in FIG. 2(A), in practical application the circuit has a premise:

$$2N_s \geq N_a \quad (5)$$

A very low output voltage, namely 1.5V or less, would require a reduction in the number of turns of the winding $N_s$. However, a reduction in the number of turns of the winding $N_a$ would not ensure a reasonable gate drive voltage for the synchronous rectifiers. On the other hand, if the number of turns of the winding $N_a$ are made substantially greater than the number of turns of the winding $N_s$, i.e., if $2N_s \leq N_a$ the winding $N_a$ will short through the loop of $N_a$, $D_1$, $S_4$ and $ZD_1$ (or the loop of $N_a$, $D_2$, $2N_s$, $S_3$ and $ZD_2$). If this occurs, the self-driven circuit shown in FIG. 2(A) will not work.

This invention discloses a novel self-driven scheme that overcomes the above-mentioned drawbacks of the prior art self-driven schemes.

SUMMARY OF THE INVENTION

A self-driven synchronous rectifier circuit in accordance with one aspect of the present invention includes an input circuit including a transformer having a primary winding for receiving a voltage, a secondary winding and an auxiliary winding. First and second synchronous rectifiers connected to the secondary winding of the transformer and responsive to the signal across the auxiliary winding are provided for selectively and alternatively turning the synchronous rectifiers ON and OFF. A first clamping circuit is provided for clamping the second synchronous rectifier when the first synchronous rectifier is turned ON and a second clamping circuit is provided for clamping the first synchronous rectifier when the second synchronous rectifier is turned ON. The first clamping circuit includes a first switching device operative to disable the first clamping circuit when the second clamping circuit is operative, and the second clamping circuit includes a second switching device operative to disable the second clamping circuit when the first clamping circuit is operative.

In accordance with another aspect, the self-driven synchronous rectification circuit of the present invention includes two power switches $S_1$ and $S_2$; a transformer Tr having a primary winding $N_p$, a secondary winding $N_s$ and an auxiliary winding $N_a$; two secondary synchronous rectifiers $S_3$ and $S_4$; two diodes $D_1$ and $D_2$; and two zener diodes $ZD_1$ and $ZD_2$; and two switching transistors $Q_1$ and $Q_2$.

In the circuit of the present invention, when $S_3$ conducts, the gate-drive voltage of $S_4$ is clamped by $D_1$ and $Q_1$. Also, when $S_4$ conducts, the gate-drive voltage of $S_3$ is clamped by $D_2$ and $Q_2$. In other words, $D_1$, $Q_1$ and $Q_2$ prevent $S_3$ and $S_4$ from conducting at the same time. $ZD_1$ and $ZD_2$ restrain the gate over voltage of $S_3$ and $S_4$, respectively.

Further, when the gate drive voltage of $S_4$ is clamped by $D_1$ and $Q_1$, $Q_2$ disables $D_2$ and when the gate drive voltage of $S_3$ is clamped by $D_2$ and $Q_2$, $Q_1$ disables $D_1$.

BRIEF DESCRIPTION OF THE DRAWINGS

Other features and advantages of the present invention will become apparent from the following description of the invention which refers to the accompanying drawings, wherein.

DETAILED DESCRIPTION OF THE PREFERRED EMBODIMENTS

Figure 3:
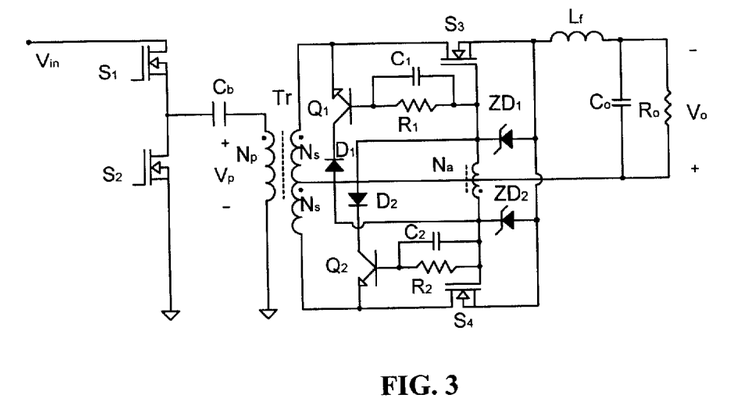
FIG. 3 is a circuit diagram showing the self-driven synchronous rectifier circuit of the present invention applied to a forward converter.
Figure 4:
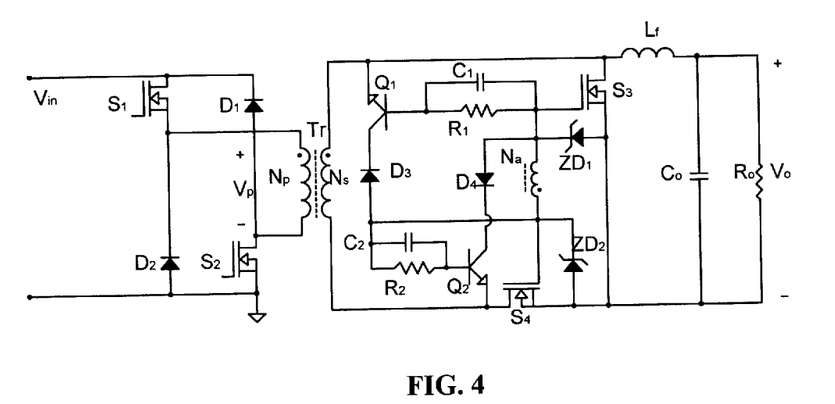
FIG. 4 is a circuit diagram showing the self-driven synchronous rectifier circuit of the present invention applied to a full-bridge converter.
Figure 5:
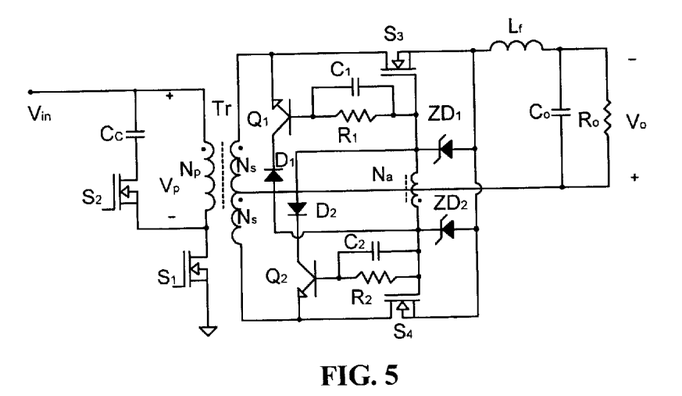
FIG. 5 illustrates an application of the novel self-driven synchronous rectification circuit to forward-flyback converter.
Figure 6:
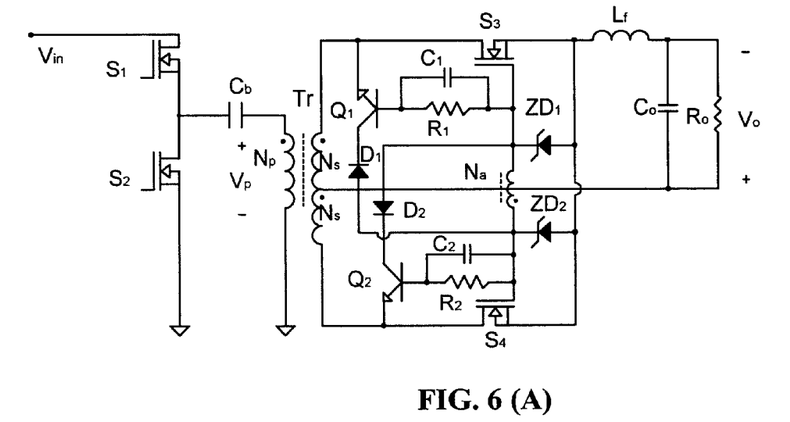
FIG. 6(A) illustrates an application of the novel self-driven synchronous rectifier circuit to symmetrical HB converter and FIG. 6(B) shows the gate drive waveforms.
Figure 7:
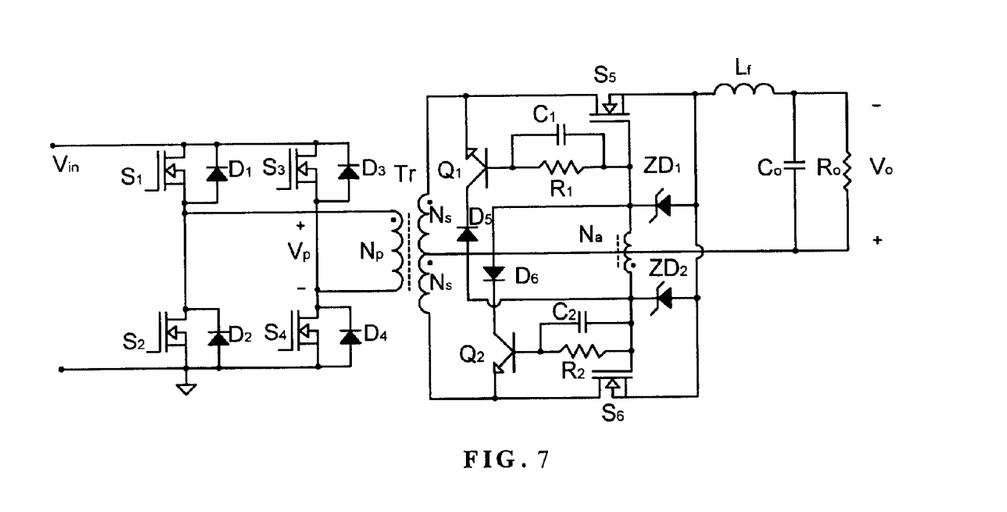
FIG. 7 illustrates an application of the novel self-driven synchronous rectifier circuit to fall bridge converter.

FIG. 3 is a circuit diagram of an asymmetrical ZVS HB converter incorporating a novel self-driven synchronous rectifier circuit in accordance with the present invention. It adds two transistors, $Q_1$ and $Q_2$, two capacitors, $C_1$ and $C_2$, and two resistors, $R_1$ and $R_2$, to the circuit of FIG. 2(A). The main waveforms of the converter are the same as shown in FIG. 2(B). The gate voltages of the two SRs, $S_3$ and $S_4$, are also the same as equation (3) and (4). As with the circuit of FIG. 2(A), the number of auxiliary winding turns $N_a$ of the transformer Tr ensure that the synchronous rectifiers $S_3$ and $S_4$ are supplied with an adequate gate-drive voltage. The selection of the number of auxiliary winding turns for use is determined according to the output voltage required. Such a determination will be evident to one of ordinary skill in the art, and will depend upon, for example, the wire size chosen and the inductance required of the winding.

The principle of operation is described as follows. During $[t_0, t_1]$, $S_2$ is ON and $S_1$ is OFF, so $Q_2$ is OFF and the loop of $N_a$, $D_2$, $2N_s$, $S_3$ and $ZD_2$ is cut OFF. So while $2N_s \leq N_a$, the short circuiting of winding $N_a$ is prevented. Since the primary voltage of transformer is $DV_{in}$, the voltage of auxiliary winding, namely the gate-drive voltage of $S_3$, is. When $Q_1$ is ON, the gate-drive voltage of $S_4$ is clamped to zero through $D_1$, $Q_1$ and $S_3$. At time $t_1$, $S_2$ is turned OFF and $S_1$ is turned ON (FIG. 2B). The voltage of the primary winding of transformer $N_p$ reverses, so do the voltages on the secondary winding N, and auxiliary winding $N_a$. Then $Q_1$ is turned OFF and the loop of $N_a$, $D_1$, $2N_s$, $S_4$ and $ZD_1$ is cut OFF. During this interval, the gate-drive voltage of $$S_4 \text{ is } \frac{N_a}{N_p}(1-D)V_{in},$$

and since $Q_2$ is on, the gate-drive voltage of $S_3$ is clamped to zero through $D_2$, $Q_2$ and $S_4$. $C_1$ and $C_2$ is to accelerate the conduction of $Q_1$ and $Q_2$ and the function of $ZD_1$ and $ZD_2$ is to restrain the gate over voltage of $S_3$ and $S_4$, respectively. $D_1$, $Q_1$ and $D_2$, $Q_2$ also prevent $S_3$ and $S_4$ from conducting at the same time. Additionally, $Q_1$ functions to open the loop containing $D_1$ during the periods when $D_1$ is not acting to clamp the gate drive voltage of $S_3$, and $Q_2$ functions to open the loop containing $D_2$ during the periods when $D_2$ is not acting to clamp the gate drive voltage of $S_4$. In this novel self-driven scheme, the output voltage has no relationship to the drive voltage of $S_3$ and $S_4$.

The principles of the invention may be applied to a wide variety of DC-DC converters.

For example, FIGS. 4, 5, 6(A), 6(B) and 7 show the application of the principles of the invention to a fall-bridge converter, a forward-flyback converter, a symmetrical (HB) half-bridge converter and to another full-bridge converter.

In all cases, $D_1$, $Q_1$, $D_2$ and $Q_2$ prevent $S_3$ and $S_4$ from conducting at the same time, $Q_1$ functions to open the loop containing $D_1$ when $D_1$ is $D_2$ not acting to clamp $S_4$, and $Q_2$ functions to open the loop containing $D_2$ is not acting to clamp the gate drive voltage of $S_4$.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A self-driven synchronous rectifier circuit, comprising:
   an input circuit including a transformer having a primary winding for receiving a voltage, a secondary winding and an auxiliary winding;
   first and second synchronous rectifiers connected to the secondary winding of the transformer and responsive to a signal across the auxiliary winding for selectively and alternatively turning the synchronous rectifiers ON and OFF;

a first clamping circuit for clamping the second synchronous rectifier when the first synchronous rectifier is turned ON;

a second clamping circuit for clamping the first synchronous rectifier when the second synchronous rectifier is turned ON;

the first clamping circuit including a first switching device operative to disable the first clamping circuit when the second clamping circuit is operative; and the second clamping circuit including a second switching device operative to disable the second clamping circuit when the first clamping circuit is operative.

2. The self-driven synchronous rectifier circuit according to claim 1, wherein the first clamping circuit includes a diode and the first switching device comprises a first switching transistor.

3. The self-driven synchronous rectifier circuit according to claim 1, wherein the second clamping circuit includes a second diode and the second switching device comprises a second switching transistor.

4. A self-driven synchronous rectifier circuit, comprising:

an input circuit including a transformer having a primary winding for receiving a voltage, a secondary winding and an auxiliary winding;

a first synchronous rectifier connected to the secondary winding of the transformer;

a second synchronous rectifier connected to the secondary winding of the transformer, the auxiliary winding being connected to a gate of each of the first and second synchronous rectifiers to provide a gate drive voltage thereto;

a first diode connected to the second synchronous rectifier;

a second diode connected to the first synchronous rectifier, wherein the first and second diodes are operable to prevent the first and second synchronous rectifiers from conducting at the same time by selectively clamping gate drive voltages of the first and second synchronous rectifier; and first and second switching devices connected, respectively, to the first and second diodes for selectively disconnecting the diodes from operability.

5. The self-driven synchronous rectifier circuit according to claim 4, wherein the gate drive voltage of the second synchronous rectifier is clamped by the first diode and the first switching device when the first synchronous rectifier conducts.

6. The self-driven synchronous rectifier circuit according to claim 4, wherein the gate drive voltage of the first synchronous rectifier is clamped by the second diode and the second switching device when the second synchronous rectifier conducts.

7. The self-driven synchronous rectifier circuit according to claim 4, wherein the gate voltages of the first synchronous rectifier and the second synchronous rectifier are adjusted by selecting the number of turns of the auxiliary winding.

8. The self-driven synchronous rectifier circuit according to claim 4, further comprising:

a third diode connected to the second synchronous rectifier; and a fourth diode connected to the first synchronous rectifier, the third diode operating to restrain gate over voltage of the first synchronous rectifier, the fourth diode operating to restrain gate over voltage of the second synchronous rectifier.

9. The self-driven synchronous rectifier circuit according to claim 8, wherein the third and fourth diodes are zener diodes.

* * * * *